(12) United States Patent
Kobayashi

(10) Patent No.: US 11,355,149 B2
(45) Date of Patent: Jun. 7, 2022

(54) INFORMATION RECORDING DEVICE, INFORMATION PLAYBACK DEVICE, INFORMATION RECORDING MEDIUM AND METHOD FOR MULTI-VALUES RECORDING OPTICAL DISC

(71) Applicant: SONY CORPORATION, Tokyo (JP)

(72) Inventor: Nobuyoshi Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,191

(22) PCT Filed: May 22, 2019

(86) PCT No.: PCT/JP2019/020274
§ 371 (c)(1),
(2) Date: Dec. 11, 2020

(87) PCT Pub. No.: WO2019/244550
PCT Pub. Date: Dec. 26, 2019

(65) Prior Publication Data
US 2021/0257000 A1 Aug. 19, 2021

(30) Foreign Application Priority Data
Jun. 20, 2018 (JP) ................................. 2018-116598

(51) Int. Cl.
*G11B 7/126* (2012.01)
*G11B 7/0045* (2006.01)
(Continued)

(52) U.S. Cl.
CPC ............ *G11B 7/0045* (2013.01); *G11B 7/126* (2013.01); *G11B 7/00454* (2013.01); *G11B 7/125* (2013.01); *G11B 7/128* (2013.01)

(58) Field of Classification Search
None
See application file for complete search history.

(56) References Cited

U.S. PATENT DOCUMENTS

| 2002/0015371 | A1 | 2/2002 | Arioka | |
| 2002/0034604 | A1* | 3/2002 | Arioka | G11B 7/0052 428/64.4 |

(Continued)

FOREIGN PATENT DOCUMENTS

| CN | 1341923 A | 3/2002 |
| CN | 101930760 A | 12/2010 |

(Continued)

OTHER PUBLICATIONS

International Search Report and Written Opinion of PCT Application No. PCT/JP2019/020274, dated Jul. 16, 2019, 09 pages of ISRWO.

*Primary Examiner* — Tan X Dinh
(74) *Attorney, Agent, or Firm* — Chip Law Group

(57) ABSTRACT

An information recording/playback device includes a recording pulse generation unit generates a recording pulse based on a multi-value modulation data, and a data recording unit records the mark on the recording medium based on the recording pulse. The data recording unit executes recording processing of setting sizes of all of marks to be recorded on the recording medium to a size equal to or smaller than a spot size at a half level of a maximum value of a two-dimensional light intensity distribution of a beam spot, and executes data recording processing of forming recording regions in modes having different densities of recording marks according to the levels of the multi-value modulation data.

13 Claims, 8 Drawing Sheets

(51) Int. Cl.
*G11B 7/128* (2012.01)
*G11B 7/125* (2012.01)

(56) References Cited

U.S. PATENT DOCUMENTS

| | | | | |
|---|---|---|---|---|
| 2002/0141316 A1* | 10/2002 | Tsukamoto | ............ | G11B 7/0062 369/59.11 |
| 2002/0191512 A1* | 12/2002 | Arioka | ............... | G11B 7/00456 369/47.53 |
| 2002/0192423 A1* | 12/2002 | Arioka | ............... | G11B 7/24079 428/64.4 |
| 2003/0039191 A1* | 2/2003 | Arioka | ............... | G11B 7/24088 369/59.11 |
| 2004/0151103 A1* | 8/2004 | Arioka | ................. | G11B 7/1263 369/59.11 |
| 2004/0240340 A1* | 12/2004 | Tsukamoto | ........... | G11B 7/0045 369/47.5 |
| 2005/0013234 A1* | 1/2005 | Take | .................. | G11B 7/24088 369/275.2 |
| 2006/0072434 A1* | 4/2006 | Shintani | .................. | G11B 7/24 369/272.1 |
| 2010/0202268 A1* | 8/2010 | Nakamura | ........... | G11B 7/0062 369/59.11 |
| 2010/0322057 A1* | 12/2010 | Nakamura | ........... | G11B 7/0062 369/100 |
| 2010/0322063 A1 | 12/2010 | Fujita et al. | | |
| 2021/0012802 A1* | 1/2021 | Nakamura | ....... | G11B 20/10277 |

FOREIGN PATENT DOCUMENTS

| | | |
|---|---|---|
| EP | 1174863 A2 | 1/2002 |
| EP | 2270782 A2 | 1/2011 |
| JP | 39-050629 A | 2/1997 |
| JP | 09-270158 A | 10/1997 |
| JP | 2002-008233 A | 1/2002 |
| JP | 2002-083424 A | 3/2002 |
| JP | 2002-083446 A | 3/2002 |
| JP | 2006-004516 A | 1/2006 |
| JP | 2011-003245 A | 1/2011 |
| KR | 10-2010-0136416 A | 12/2010 |
| TW | 591639 B | 6/2004 |
| TW | 201117198 A | 5/2011 |
| WO | 2000/074045 A1 | 12/2000 |

* cited by examiner

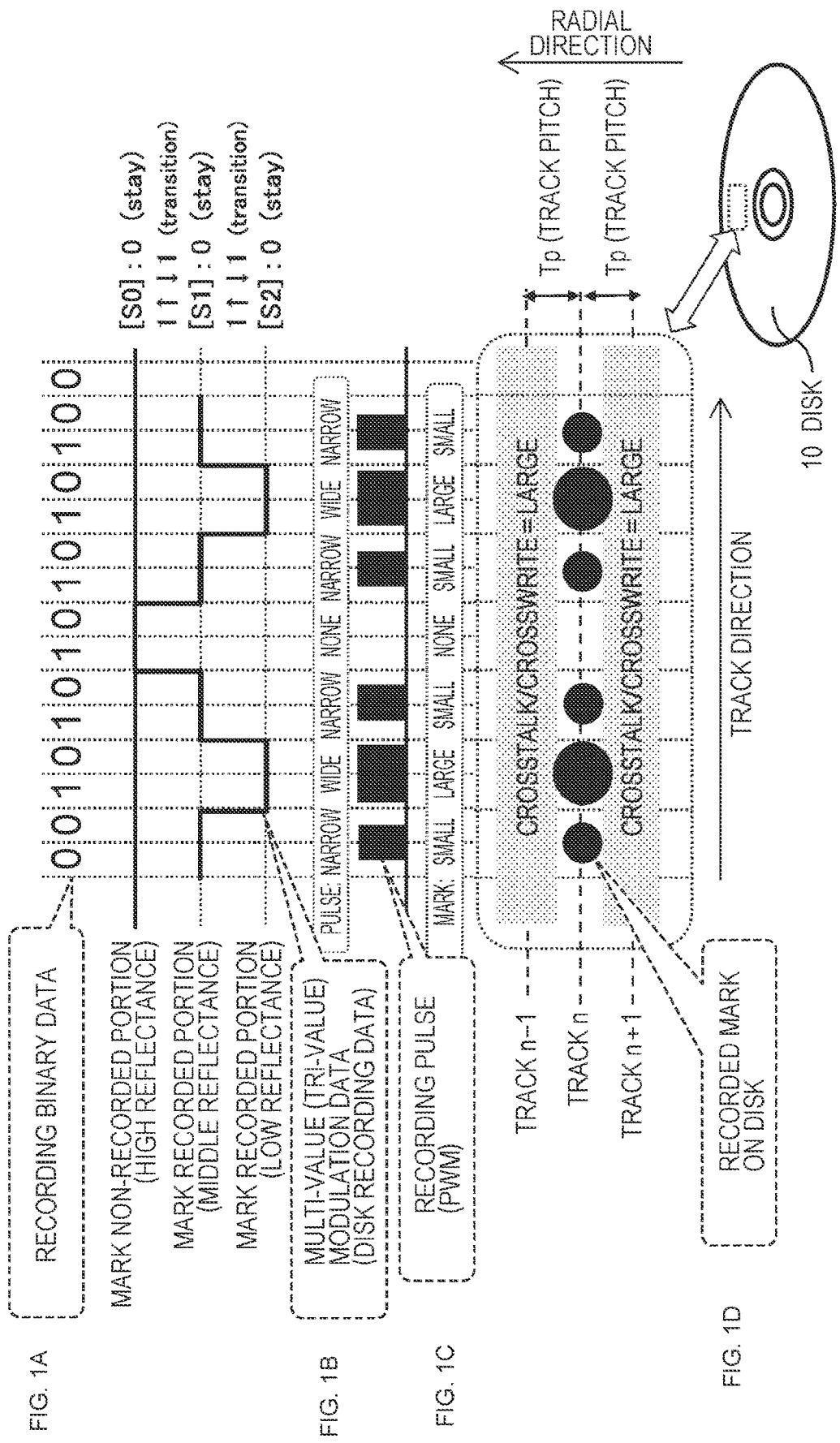

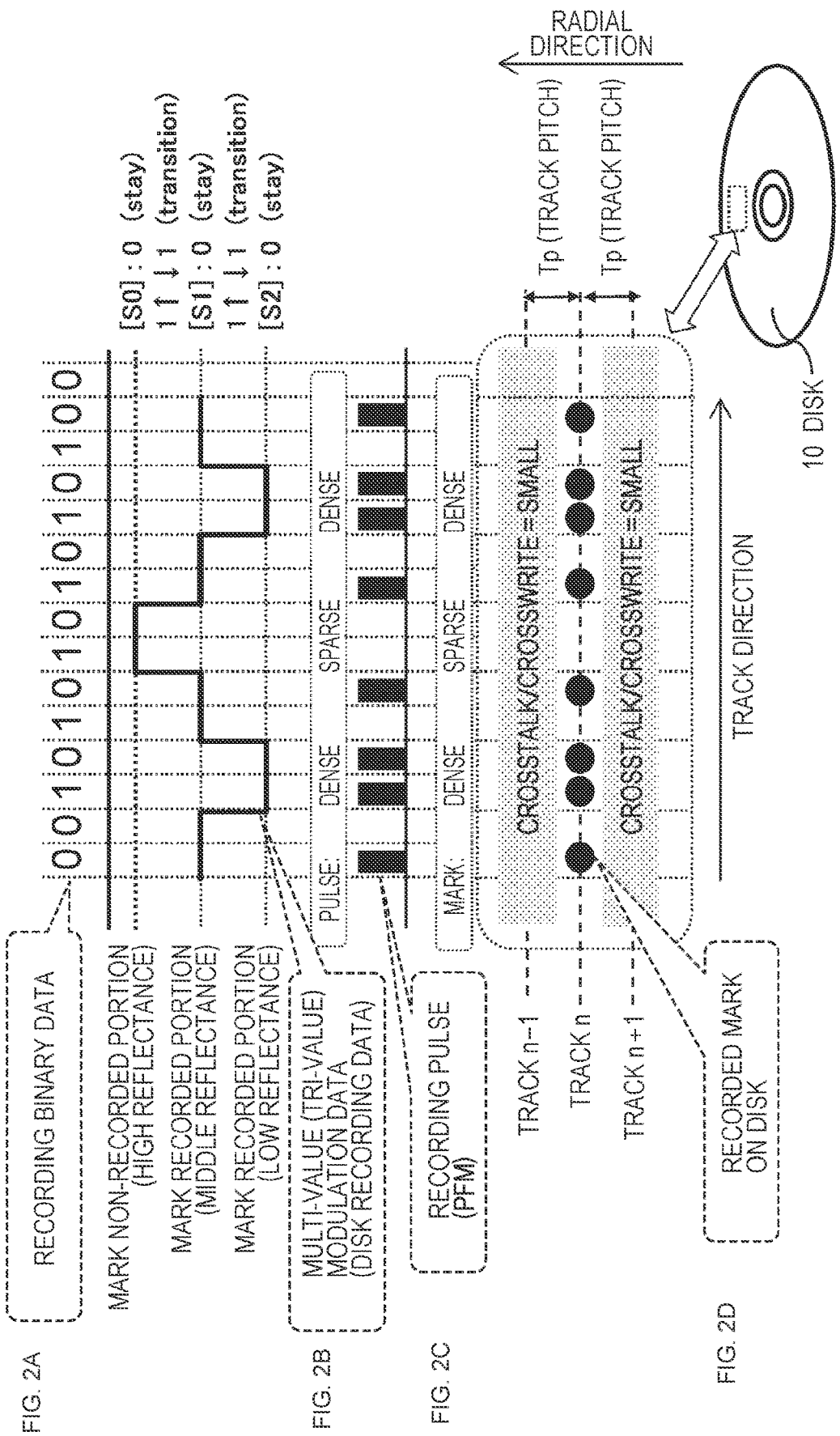

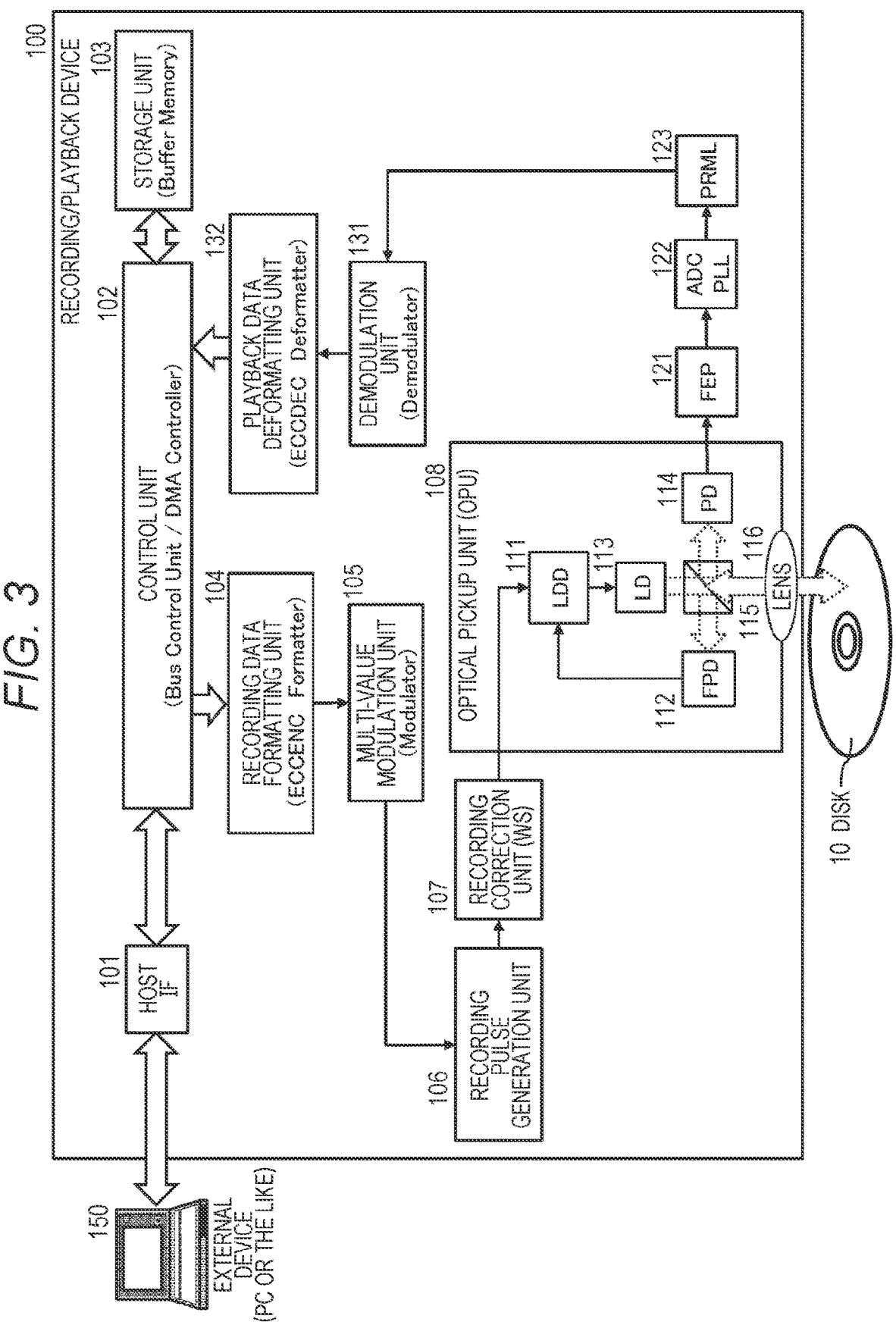

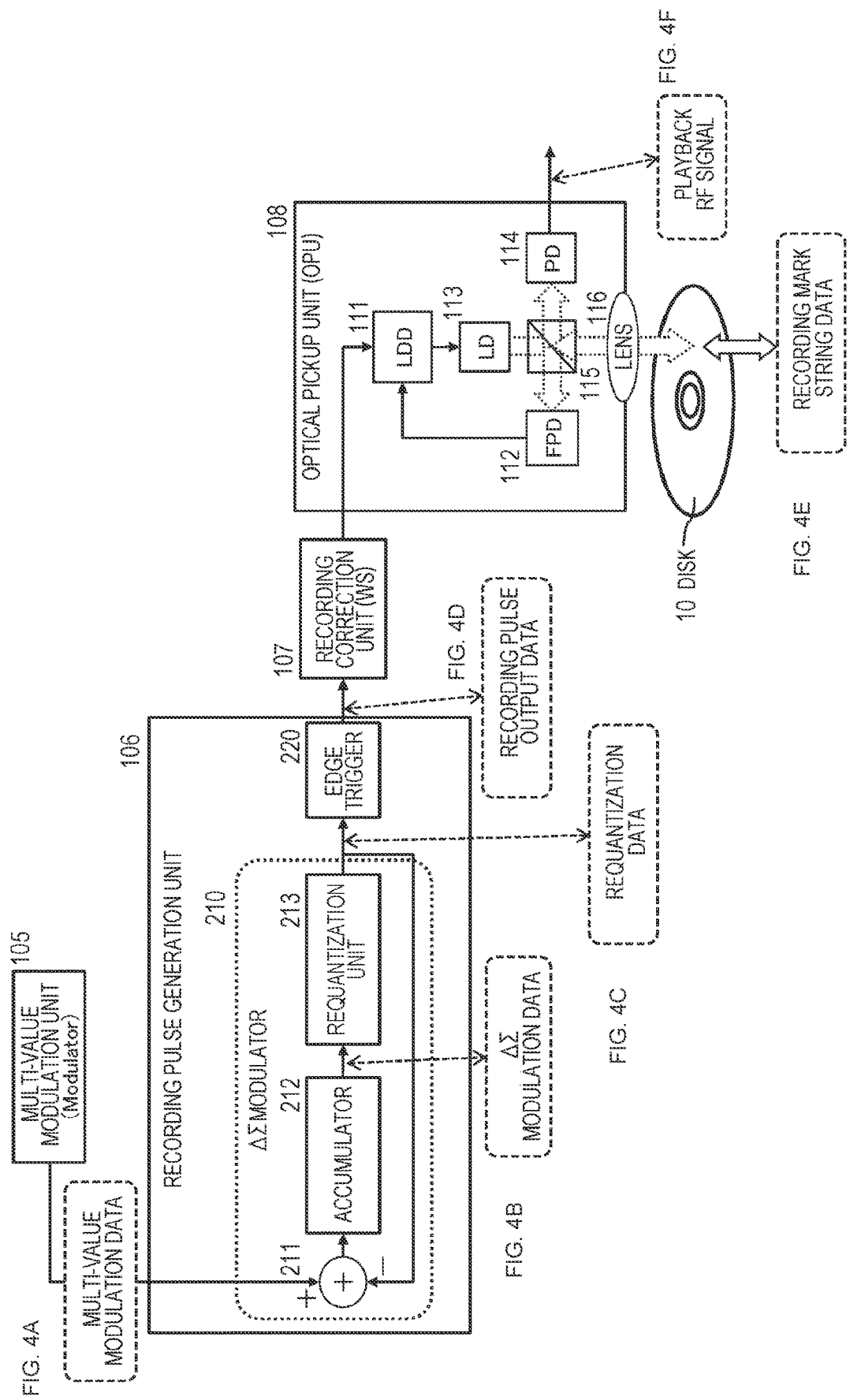

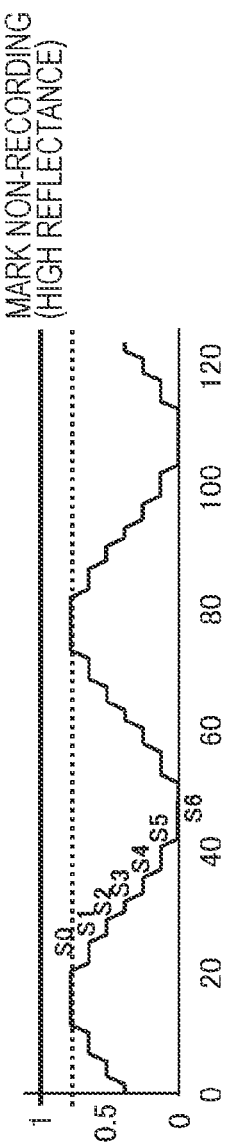
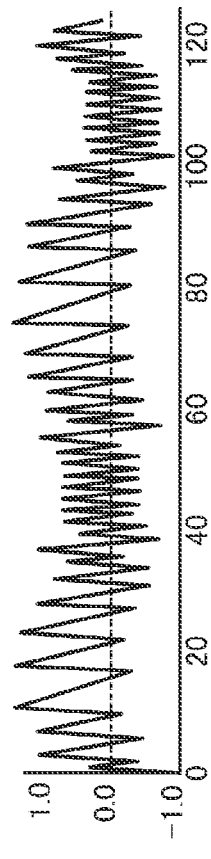
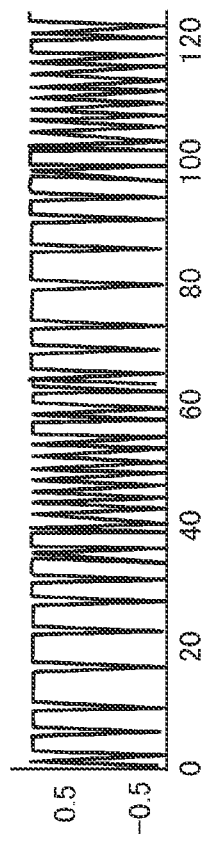
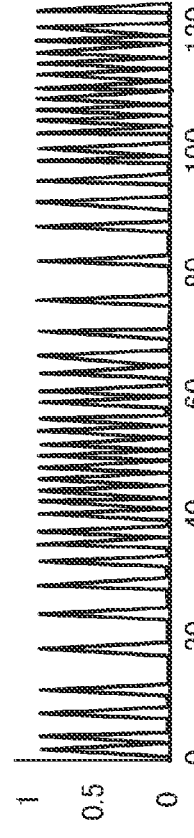
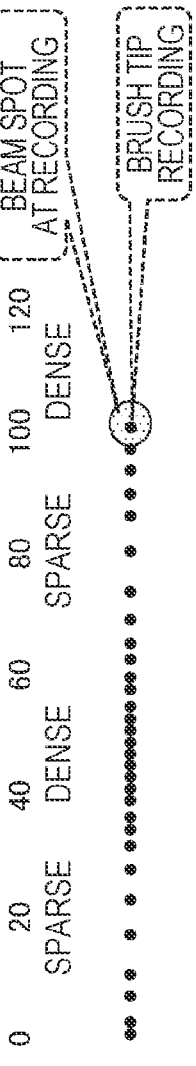
FIG. 5A  MULTI-VALUE MODULATION DATA (SEVEN VALUES)
FIG. 5B  ΔΣ MODULATION DATA (FIRST ORDER)
FIG. 5C  REQUANTIZATION DATA (BINARY)
FIG. 5D  RECORDING PULSE OUTPUT DATA (PFM)
FIG. 5E  RECORDING MARK STRING DATA

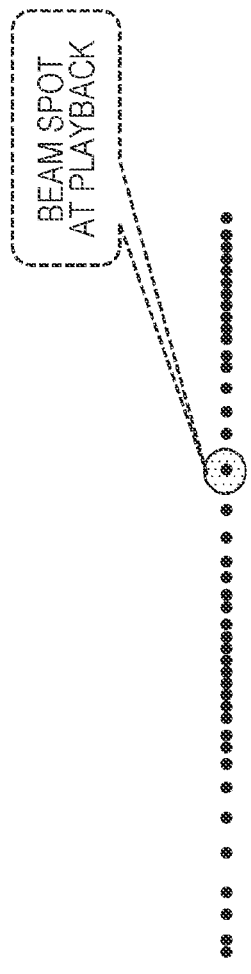
FIG. 6A  RECORDING MARK STRING DATA
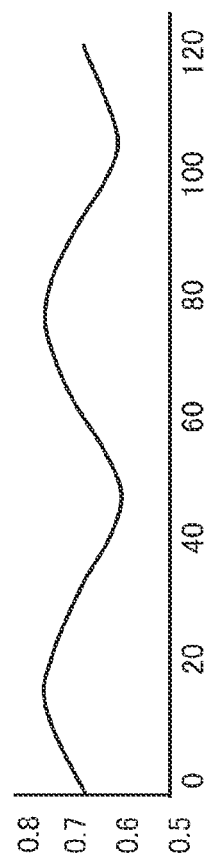
FIG. 6B  PLAYBACK RF SIGNAL

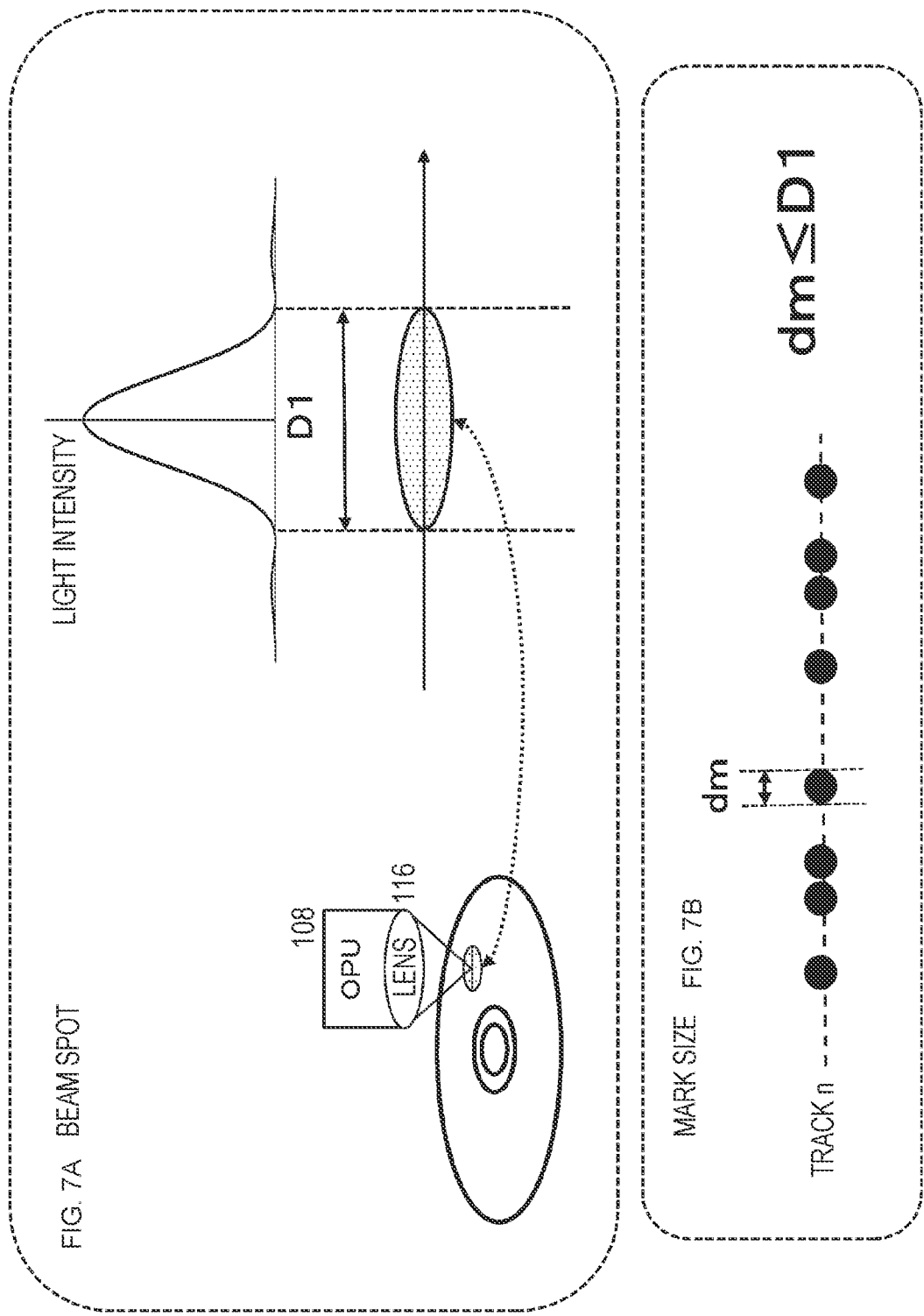

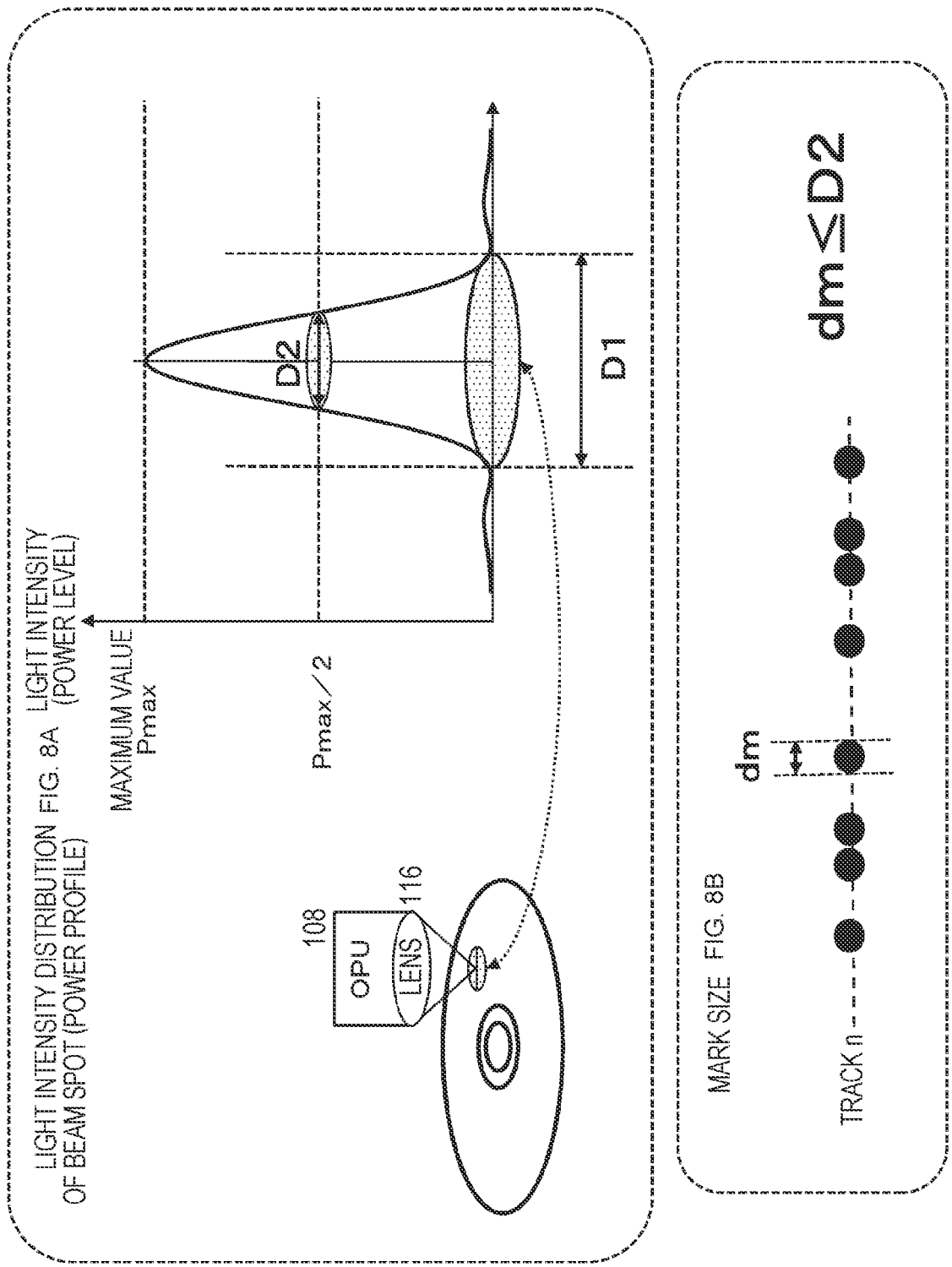

INFORMATION RECORDING DEVICE, INFORMATION PLAYBACK DEVICE, INFORMATION RECORDING MEDIUM AND METHOD FOR MULTI-VALUES RECORDING OPTICAL DISC

CROSS REFERENCE TO RELATED APPLICATIONS

This application is a U.S. National Phase of International Patent Application No. PCT/JP2019/020274 filed on May 22, 2019, which claims priority benefit of Japanese Patent Application No. JP 2018-116598 filed in the Japan Patent Office on Jun. 20, 2018. Each of the above-referenced applications is hereby incorporated herein by reference in its entirety.

TECHNICAL FIELD

The present disclosure relates to an information recording device, an information playback device, an information recording medium, a method, and a program. More specifically, the present invention relates to an information recording device, an information playback device, an information recording medium, a method, and a program for recording and playing-back high-density data on an information recording medium.

BACKGROUND ART

Optical discs such as digital versatile discs (DVDs) and Blu-ray (registered trademark) discs (BDs) are often used as information recording media (recording media) for recording various types of content such as movies and music.

Most of the current recording media such as BDs mainly record HD images, so-called high-definition compatible 2K images, but in the future, the image quality will be improved and an increase in the number of media recording ultra-high definition images (UHD images) is expected. Note that a typical example of the ultra-high definition image (UHD image) includes a high-resolution image such as a 4K or 8K image, for example.

The amount of information in these high-quality data is enormous, and higher-density information recording is required on a disk such as a BD.

Multi-value recording is one of high-density information recording methods. In the current multi-value recording, the size of a recording mark is adjusted by modulating laser light intensity (recording power) and recording pulse width (pulse width modulation: PWM) during recording according to a multi-value modulation signal, and a mark having a size (area and depth) according to each level of the multi-value modulation signal is formed on the disk.

Note that, as conventional techniques describing multi-value recording processing, there are Patent Document 1 (Japanese Patent Application Laid-Open No. 2006-004516), Patent Document 2 (International Publication WO 2000/074045), and the like, for example.

CITATION LIST

Patent Document

Patent Document 1: Japanese Patent Application Laid-Open No. 2006-004516
Patent Document 2: International Publication WO 2000/074045

SUMMARY OF THE INVENTION

Problems to be Solved by the Invention

A track pitch, which is an interval in a radial direction between recording mark strings on the disk, is set to a narrow dimension within a range not interfering with a beam spot size related to recording/playback in order to make the recording density per area high.

Here, the beam spot size means an irradiation range (corresponding to an innermost region of the Newton ring) of 0th order light of a light intensity distribution (power profile) of an optical Fourier transform image of an objective lens opening at a focal point of a laser beam focused on a recording medium board from the objective lens of an optical pickup unit (OPU).

Furthermore, the above-described "range not interfering" means that here an influence of crosstalk and crosswrite (described below) is not remarkable.

In the current multi-value recording, the size of a recording mark is adjusted by modulating laser light intensity (recording power) and recording pulse width (PWM) during recording according to a multi-value modulation signal, and a mark having a size (area and depth) according to each level of the multi-value modulation signal is formed on the disk. This is called multi-value recording by mark size modulation. At a deep gradation level of multi-value recording by mark size modulation in a post-recording low reflectance medium such as phase change medium, a recording mark of a size exceeding a beam spot is formed by a thermal action of recording laser beam irradiation with a relatively wide PWM pulse width.

On a disk having a relatively narrow track pitch compared to the beam spot, which is oriented toward high-density recording, the mark having the size exceeding the beam spot affects a playback signal of an adjacent track. That is, crosstalk occurs during playback. Furthermore, in data recording processing, a mark protruding to an adjacent track may be recorded, and so-called crosswrite that affects recording data of the adjacent track may occur.

There, the crosswrite refers to, in the post-recording low reflectance medium such as phase change medium, reducing the reflectance of an unrecorded portion (including a space portion and a wall surface corresponding a Groove-Land transition region) of an adjacent track due to the thermal action associated with the recording laser beam irradiation with the own track, causing a decrease in the modulation degree of a recording mark string of the adjacent track, and deteriorating an SNR or damaging the linearity of a level gradation in the multi-value recording.

The present disclosure has been made in view of the above problems, and an object is to provide an information recording device, an information playback device, an information recording medium, a method, and a program for recording a multi-value modulation signal with prevented or reduced crosstalk or crosswrite to implement high-quality and high-density data recording/playback.

In one embodiment of the present disclosure, provided are an information recording device, an information playback device, an information recording medium, a method, and a program for recording a multi-value modulation signal with prevented or reduced crosstalk or crosswrite to implement high-quality and high-density data recording/playback by recording the multi-value modulation signal without changing the size of a recording mark on a disk.

Solutions to Problems

The first aspect of the present disclosure resides in
an information recording device including:
a recording pulse generation unit configured to generate a recording pulse based on multi-value modulation data; and
a data recording unit configured to record a mark on a recording medium on the basis of the recording pulse generated by the recording pulse generation unit, in which
the data recording unit executes data recording processing of setting sizes of all of marks to be recorded on the recording medium to be a size equal to or smaller than a spot size of a beam spot.

Moreover, the second aspect of the present disclosure resides in
an information recording medium in which marks based on multi-value modulation data are recorded, in which
only the marks having a size equal to or smaller than a spot size of a beam spot are recorded.

Moreover, the third aspect of the present disclosure resides in
an information playback device including:
a data readout unit configured to execute readout of a mark recorded in an information recording medium and acquire multi-value modulation data; and
a demodulation unit configured to receive an input of the multi-value modulation data acquired by the data readout unit and generate binary data, in which
the data readout unit executes processing of reading a mark having a size equal to or smaller than a spot size of a beam spot of an optical pickup unit.

Moreover, the fourth aspect of the present disclosure resides in
an information recording method in which an information recording device executes information recording processing on an information recording medium, the information recording method including:
by a recording pulse generation unit, a recording pulse generation step of generating a recording pulse based on multi-value modulation data; and
by a data recording unit, a data recording step of recording a mark on a recording medium on the basis of the recording pulse generated by the recording pulse generation unit, in which,
in the data recording step,
data recording processing of setting sizes of all of marks to be recorded on the recording medium to be a size equal to or smaller than a spot size of a beam spot is executed.

Moreover, the fifth aspect of the present disclosure resides in
a program for causing an information recording device to execute information recording processing on an information recording medium, the information recording processing including:
a recording pulse generation step of causing a recording pulse generation unit to generate a recording pulse based on multi-value modulation data; and
a data recording step of causing a data recording unit to record a mark on a recording medium on the basis of the recording pulse generated by the recording pulse generation unit, in which,
in the data recording step,
data recording processing of setting sizes of all of marks to be recorded on the recording medium to be a size equal to or smaller than a spot size of a beam spot is executed.

Note that the program of the present disclosure is, for example, a program that can be provided by a storage medium or a communication medium provided in a computer readable format to an information processing apparatus or a computer system that can execute various program codes. By providing such a program in the computer readable format, processing according to the program is realized on the information processing apparatus or the computer system.

Still other objects, features, and advantages of the present disclosure will become clear from more detailed description based on embodiments and attached drawings of the present disclosure described below. Note that a system in the present description is a logical aggregate configuration of a plurality of devices, and is not limited to devices having respective configurations within the same housing.

Effects of the Invention

According to a configuration of an embodiment of the present disclosure, a configuration to limit a size of a mark to be recorded on a recording medium to a beam spot size or smaller to enable prevention and reduction of crosstalk and crosswrite is implemented.

Specifically, for example, a recording pulse generation unit configured to generate a recording pulse based on a multi-value modulation data, and a data recording unit configured to record the mark on the recording medium on the basis of the recording pulse are included. The data recording unit executes recording processing of setting sizes of all of marks to be recorded on the recording medium to a size equal to or smaller than a spot size at a half (½) level of a maximum value (Pmax) of a two-dimensional light intensity distribution (power profile) of a beam spot (hereinafter, the level is referred to as half width), and executes data recording processing of forming recording mark strings in modes having different densities of recording marks according to levels of the multi-value modulation data.

With the present configuration, a configuration to make the size of the mark to be recorded on the recording medium small to enable prevention and reduction of crosstalk and crosswrite is implemented.

Note that the effects described in the present description are merely examples and are not limited, and additional effects may be exhibited.

BRIEF DESCRIPTION OF DRAWINGS

FIGS. 1A, 1B, 1C, and 1D are diagrams for describing a current multi-value modulation signal recording configuration example.

FIGS. 2A, 2B, 2C, and 2D are diagrams for describing a multi-value modulation signal recording configuration example of the present disclosure.

FIG. 3 is a diagram for describing a configuration example of a recording/playback device having functions of both a recording device and a playback device of the present disclosure.

FIGS. 4A, 4B, 4C, 4D, 4E, and 4F are diagrams for describing a specific example of a recording pulse generation unit.

FIGS. 5A, 5B, 5C, 5D, and 5E are diagrams for describing recording pulse generation processing executed by the recording pulse generation unit.

FIGS. 6A and 6B are diagrams for describing a playback process of a recording mark recorded on a disk.

FIGS. 7A and 7B are diagrams for describing an example of specification of a mark size recorded on a disk.

FIGS. 8A and 8B are diagrams for describing an example of specification of a mark size recorded on a disk.

MODE FOR CARRYING OUT THE INVENTION

Hereinafter, an information recording device, an information playback device, an information recording medium, a method, and a program of the present disclosure will be described in detail with reference to the drawings. Note that the description will be given according to the following items.

1. Current multi-value modulation signal recording configuration example
2. Multi-value modulation signal recording configuration example of present disclosure
3. Configuration example of recording device and playback device of present disclosure
4. Specific example of mark size
5. Recording medium to which processing of present disclosure is applicable
6. Conclusion of configuration of present disclosure

[1. Current Multi-Value Modulation Signal Recording Configuration Example]

First, a current multi-value modulation signal recording configuration example will be described with reference to FIGS. 1A, 1B, 1C, and 1D.

As described above, multi-value recording is one of methods for recording high-density information on a recording medium such as a disk. In the current multi-value recording, the size (including the depth) of a recording mark is adjusted by modulating laser recording power and recording pulse width (PWM) according to a multi-value modulation signal, and a mark having a size according to each level of the multi-value modulation signal is formed on the disk.

FIGS. 1A, 1B, 1C, and 1D are diagrams for describing a current multi-value modulation signal recording configuration example.

FIGS. 1A, 1B, 1C, and 1D illustrate the following data in order from the top. Here, a case in which multi-value is tri-value will be described as an example.

FIG. 1A recording binary data
FIG. 1B multi-value (tri-value) modulation data
FIG. 1C recording pulse
FIG. 1D recording mark on disk The FIG. 1A recording binary data is binary data of 0 and 1. The example in FIGS. 1A, 1B, 1C, and 1D illustrate the following recording bit string:

[0, 0, 1, 0, 1, 0, 1, 0, 1, 0, 1, 0, 1, 0, 0].

The FIG. 1B multi-value (tri-value) modulation data is data obtained by modulating the recording binary data described in FIG. 1A into a multi-value. The multi-value modulation example illustrated in FIGS. 1A, 1B, 1C, and 1D are examples in which binary data is modulated into tri-value multi-value data. Note that tri-value or more various multi-value data are available as the multi-value data recorded on the disk. The binary data can be modulated into any multi-value data such as four-value, five-value, or more.

The example of multi-value (tri-value) data illustrated in FIGS. 1A, 1B, 1C, and 1D are configured by three values: S0, S1, and S2. A transition rule among the three values of S0, S1, and S2 is arbitrary. For example, in a case where a bit value of the recording binary data=0, the transition among the three values of S0, S1, and S2 is not executed, whereas in a case where the bit value of the recording binary data=1, the transition among the three values of S0, S1, and S2 is executed. A level of multi-value modulation in this case transitions according to a sequence of S0→S1→S2→S1→S0.

According to such a multi-value modulation rule, the FIG. 1A recording binary data in FIGS. 1A, 1B, 1C, and 1D are modulated into the FIG. 1B multi-value (tri-value) modulation data in FIGS. 1A, 1B, 1C, and 1D.

The FIG. 1B multi-value (tri-value) modulation data is data that specifies a mark string to be recorded on a disk 10. Mark recording modes are controlled as follows according to the values of S0, S1, and S2 of the multi-value (tri-value) modulation data:

S0=no mark record;
S1=record a mark having a first size (a size equal to or smaller than the beam spot, for example); and
S2=record a mark having a second size (a size exceeding the beam spot, for example).

Note that processing of recording marks of such various sizes is performed by laser recording power control and recording pulse width modulation (PWM).

The FIG. 1C recording pulses illustrated in FIGS. 1A, 1B, 1C, and 1D are a recording pulse string corresponding to the values of S0, S1, and S2 of the multi-value (tri-value) modulation data. The recording pulse string generated according to the above mark recording control is illustrated.

The mark is recorded on the disk 10 according to the FIG. 1C recording pulse illustrated in FIGS. 1A, 1B, 1C, and 1D. This recording mark is the FIG. 1D recording mark on disk illustrated in FIGS. 1A, 1B, 1C, and 1D.

Here, the mark in FIG. 1D illustrates a case of a reflectance degradation recording medium such as a phase change medium. Further, the mark size means not only a geometric area of the recording mark but also an optical area (an area calculated by weight-integrating reflectance distribution of the mark).

As illustrated in the FIG. 1D recording mark on disk in FIGS. 1A, 1B, 1C, and 1D, the marks having different sizes constitute the mark string.

In this way, the laser recording power and the recording pulse width are modulated (PWM) according to the multi-value modulation signal, and the size of the recording mark on the disk is controlled, whereby the mark of the size according to each level of the multi-value modulation signal can be formed on the disk.

The FIG. 1D recording mark on disk in FIGS. 1A, 1B, 1C, and 1D corresponds to one track on the disk 10. The mark string recorded on a track n is illustrated. The mark string of the marks having different sizes is recording data generated by modulating the recording binary data [0, 0, 1, 0, 1, 0, 1, 0, 1, 0, 1, 0, 1, 0, 0] illustrated in FIG. 1A into the multi-value (tri-value).

However, when marks having various sizes based on the multi-value modulation data are recorded on the disk in this way, a mark having a size exceeding the beam spot affects a playback signal of an adjacent track on the disk with a narrow track pitch. That is, there is a problem of occurrence of crosstalk during playback. Furthermore, in the data recording processing, a mark protruding to an adjacent track may be recorded, and so-called crosswrite that affects recording data of the adjacent track may occur.

As a result, a problem occurs, in which the recording data of the track n illustrated in FIGS. 1A, 1B, 1C, and 1D affect data playback processing or recording processing of adjacent tracks n−1 and n+1, and deteriorates an SN ratio of playback data, that is, deteriorates the playback quality.

[2. Multi-Value Modulation Signal Recording Configuration Example of Present Disclosure]

Next, a multi-value modulation signal recording configuration example of the present disclosure for solving the above problem will be described.

FIGS. 2A, 2B, 2C, and 2D are diagrams for describing a multi-value modulation signal recording configuration example of the present disclosure.

FIGS. 2A, 2B, 2C, and 2D illustrate the following data in order from the top, similarly to FIGS. 1A, 1B, 1C, and 1D.

FIG. 2A recording binary data
FIG. 2B multi-value (tri-value) modulation data
FIG. 2C recording pulse
FIG. 2D recording mark on disk The FIG. 2A recording binary data is binary data of 0 and 1. The example in FIGS. 1A, 1B, 1C, and 1D illustrate the following recording bit string:

[0, 0, 1, 0, 1, 0, 1, 0, 1, 0, 1, 0, 1, 0, 0].

The FIG. 2B multi-value (tri-value) modulation data is data obtained by modulating the recording binary data described in FIG. 2A into a multi-value. FIGS. 2A, 2B, 2C, and 2D illustrate an example in which binary data is modulated into tri-value multi-value data, similarly to the description with reference to FIGS. 1A, 1B, 1C, and 1D. The tri-value multi-value data is configured by three values of S0, S1, and S2.

A transition rule among the three values of S0, S1, and S2 is arbitrary. For example, in a case where a bit value of the recording binary data=0, the transition among the three values of S0, S1, and S2 is not executed, whereas in a case where the bit value of the recording binary data=1, the transition among the three values of S0, S1, and S2 is executed. A level of multi-value modulation in this case transitions according to a sequence of S0→S1→S2→S1→S0.

According to such a multi-value modulation rule, the FIG. 2A recording binary data in FIGS. 2A, 2B, 2C, and 2D are modulated into the FIG. 2B multi-value (tri-value) modulation data in FIGS. 2A, 2B, 2C, and 2D.

The FIG. 2B multi-value (tri-value) modulation data is data that specifies a mark string to be recorded on the disk 10. Mark recording is controlled as follows according to the values of S0, S1, and S2 of the multi-value (tri-value) modulation data:

S0=no mark record;
S1=record a mark having a predetermined size with a first density (low density); and
S2=record a mark having a predetermined size with a second density (high density).

Here, "density" means a ratio (dimensionless quantity) of the number of marks per unit length in a track direction (unit: number/m) or recording marks per area (a product of the track pitch: Tp and the unit length in the track direction) related to recording to a total area (a sum of optical areas), and the first density is lower than the second density, that is, the second density>the first density.

In the processing of the present disclosure, only marks having a predetermined size equal to or smaller than the beam spot are recorded without recording the marks having the sizes exceeding the beam spot as described with reference to FIGS. 1A, 1B, 1C, and 1D.

Both S1 and S2 record marks having the same predetermined size, but the density of the marks of S1 is less than the density of the marks of S2.

Note that, specifically, the mark having a predetermined size to be recorded in the S1 or S2 region is, for example, a mark having a size equal to or smaller than the size of the beam spot used in recording/playback processing, in particular, a mark having a size equal to or smaller than the beam spot diameter (half width) at a half (½) power level of the maximum value (Pmax) in the two-dimensional light intensity distribution (power profile) of the beam spot. A specific example of the mark size will be described in detail below.

For example, by setting the mark size to be equal to or smaller than the beam spot size, the possibility of the mark entering the beam spot of the adjacent track during playback is suppressed, and the crosstalk can be effectively reduced.

The FIG. 2C recording pulses illustrated in FIGS. 2A, 2B, 2C, and 2D are a recording pulse string corresponding to the values of S0, S1, and S2 of the multi-value (tri-value) modulation data. The recording pulse string generated according to the above mark recording control is illustrated.

The mark is recorded on the disk 10 according to the FIG. 2C recording pulse illustrated in FIGS. 2A, 2B, 2C, and 2D. This recording mark is the FIG. 2D recording mark on disk illustrated in FIGS. 2A, 2B, 2C, and 2D.

As illustrated in the FIG. 2D recording mark on disk in FIGS. 2A, 2B, 2C, and 2D, the mark string is configured only by the marks having a predetermined size equal to or smaller than the beam spot. Note that the marks having a predetermined size are not required to be exactly the same, and may be marks having any sizes that are considered to be substantially the same size. For example, the sizes may be any sizes within a statistical tolerance range, which are considered to be substantially the same size.

In the processing of the present disclosure, the size of the recording mark is not changed according to the multi-value modulation signal, and only the mark density is changed, which enables a mark string according to the multi-value modulation signal to be formed on the disk.

The FIG. 2D recording mark on disk in FIGS. 2A, 2B, 2C, and 2D correspond to one track on the disk 10. The mark string recorded on the track n is illustrated. The mark string of the marks having a predetermined size equal to or smaller than the beam spot is recording data generated by modulating the recording binary data [0, 0, 1, 0, 1, 0, 1, 0, 1, 0, 1, 0, 1, 0, 0] illustrated in FIG. 2A into the multi-value (tri-value).

As described above, the processing of the present disclosure has the configuration of recording only the marks having a predetermined size equal to or smaller than the beam spot, which does not affect an adjacent track, without recording the marks exceeding the beam spot, which affects an adjacent track.

As a result, even with the disk having a narrow track pitch, the crosstalk during playback can be reduced without affecting a playback signal of an adjacent track. Furthermore, in the data recording processing, the mark protruding to an adjacent track is not recorded, and so-called crosswrite that affects the recording data of the adjacent track can be reduced.

That is, the influence of the recording data of the track n illustrated in FIGS. 2A, 2B, 2C, and 2D on the playback processing or recording processing of data of the adjacent tracks n−1 and n+1 can be reduced. As a result, improvement of the SN ratio of the playback data and improvement of the playback quality can be realized.

Note that, in the above-description, an example of the data recording processing of forming recording regions in at least three or more types of different modes below:

(a) a mark non-recording region,
(b) a mark recording region with the first density, and
(c) a mark recording region with the second density,
where the first density is lower than the second density, on the recording medium according to the value of the multi-value modulation data has been described. However, in addition, for example, the following recording processing may be performed.

That is, data recording processing of forming recording regions in such three or more types of different modes below:
(a) a mark recording region with the first density,
(b) a mark recording region with the second density, and
(c) a mark recording region with a third density,
where the first density is lower than the second density, and the second density is lower than the third density, on the recording medium may be executed according to the value of the multi-value modulation data.

[3. Configuration Example of Recording Device and Playback Device of Present Disclosure]

Next, a configuration example of a recording device and a playback device of the present disclosure that record and play back the marks based on the multi-value modulation signal described with reference to FIGS. 2A, 2B, 2C, and 2D will be described.

FIG. 3 illustrates a configuration example of a recording/playback device 100 having functions of both a recording device and a playback device of the present disclosure.

The recording/playback device 100 is connected to an external device 150 such as a PC via a host interface 101, and receives an input of recording data (binary signal string) from the external device 150 and outputs playback data (binary signal string) generated on the basis of a playback signal from the disk 10 to the external device 150.

The external device 150 controls the operation of the recording/playback device 100 via the host I/F 101, and transfers images, sounds, and other data to the recording/playback device 100.

First, the data recording processing for the disk 10 will be described.

A control unit 102 of the recording/playback device 100 receives an input of the recording data (binary signal string) from the external device 150 such as a PC via the host IF 101. The control unit 102 controls the processing executed in the recording/playback device. Note that the control unit 102 also has functions of, for example, a bus control unit and a direct memory access controller (DMA Controller).

A storage unit (buffer memory) 103 is used as a recording region for processing programs, parameters, and the like executed by the control unit 102, also as a temporary recording region for input data from the external device 150 and for output data to the external device 150, and the like.

The control unit 102 outputs the recording data (binary signal string) input from the external device 150 such as a PC to a recording data formatting unit (ECC ENC formatter) 104.

The recording data formatting unit 104 converts the recording data (binary signal string) input from the external device 150 into a prespecified disk recording format. Note that, in this format conversion processing, processing of adding an error correction code such as error correction code (ECC) or the like is also executed.

The format data generated by the recording data formatting unit 104 is input to a multi-value modulation unit (modulator) 105.

The multi-value modulation unit (modulator) 105 converts the format data including the binary data into multi-value data of three or more values. That is, the processing is processing of generating the FIG. 2B multi-value modulation data from the FIG. 2A recording binary data described with reference to FIGS. 2A, 2B, 2C, and 2D. Note that, in the above-described example in FIGS. 2A, 2B, 2C, and 2D, the multi-value modulation processing from the binary data to the tri-value data has been described. However, the multi-value modulation processing is not limited to the tri-value data, and any multi-value data such as four-value, five-value, or more can be used.

The multi-value modulation data generated by the multi-value modulation unit (modulator) 105 is output to a recording pulse generation unit 106.

The recording pulse generation unit 106 executes processing of generating the FIG. 2C recording pulse from the FIG. 2B multi-value modulation data described with reference to FIGS. 2A, 2B, 2C, and 2D.

The recording pulse generated here does not include a pulse for recording the size exceeding the beam spot as described with reference to FIGS. 1A, 1B, 1C, and 1D, and is configured only by the mark having a predetermined size equal to or smaller than the beam spot as described with reference to FIGS. 2A, 2B, 2C, and 2D.

Note that, specifically, the predetermined size is, for example, a size equal to or smaller than the beam spot size used in the recording/playback processing, in particular, a mark having a size equal to or smaller than the beam spot diameter (half width) at the half (½) power level of the maximum value (Pmax) in the two-dimensional light intensity distribution (power profile) of the beam spot.

By setting the mark size to be recorded on the disk 10 to the predetermined size equal to or smaller than the beam spot, the influence of the recording mark string of its own track on an adjacent track is suppressed, and the crosswrite can be effectively prevented.

A specific example of pulse generation processing executed by the recording pulse generation unit 106 will be described in detail below with reference to FIGS. 4A, 4B, 4C, 4D, 4E, and 4F and the like.

The recording pulse string generated by the recording pulse generation unit 106 is supplied to an optical pickup unit (OPU) 108 via a recording correction unit (write strategy: WS) 107.

Note that the recording correction unit (WS) 107 and the optical pickup unit (OPU) 108 are components of the data recording unit that records the mark on the disk 10.

The recording correction unit (WS) 107 generates a recording signal to be output to a laser diode driver (LDD) 111 of the optical pickup unit 108 on the basis of the recording pulse string generated by the recording pulse generation unit 106. That is, the recording correction unit (WS) 107 generates the recording signal in which the shape and mode of the pulse are corrected in advance so that a mark string equivalent to the recording pulse string is formed on the medium, in consideration of non-linearity or the like of a mark formation process of the medium in recording, and outputs the recording signal to the LDD 111.

The LDD 111 of the optical pickup unit 108 drives a laser diode (LD) 113 on the basis of the recording signal according to the recording pulse string input from the recording correction unit (WS) 107, and records marks according to the recording pulse string on the disk 10.

Here, the marks recorded on the disk are only the marks having a predetermined size equal to or smaller than the beam spot described with reference to FIGS. 2A, 2B, 2C, and 2D.

The mark size control can be executed by power control of the LD 113 by the LDD 111. By controlling the power of the LD 113, the mark having a predetermined size can be recorded on the disk 10. Note that the processing of controlling the power of the LD 113 and recording the mark having the size equal to or smaller than the beam spot is called brush tip recording. That is, the recording correction unit (WS) 107 generates and outputs the recording signal for recording the mark having a predetermined size by brush tip recording to the LDD 111 of the optical pickup unit (OPU) 108.

Note that a front-monitor photo detector (FPD) 112 receives emitted light of the LD 113, the emitted light being divided by a beam splitter 115, and returns a received light signal to the LDD 111, when recording the mark on the disk 10. The LDD 111 controls optical output power of the LD 113 to a predetermined target value on the basis of the received light signal, and records a mark string according to the recording pulse string input from the recording correction unit (WS) 107 on the track with a predetermined mark size.

By such control, the mark string including only the marks having a predetermined size equal to or smaller than the beam spot described with reference to FIGS. 2A, 2B, 2C, and 2D are recorded on the disk 10.

Next, processing of reading and playing back the mark string recorded on the disk 10 will be described.

An outline of data playback processing is as follows. First, a data readout unit configured by the optical pickup unit (OPU) 108 to a PRML 123 executes readout of the marks from the disk 10 and processing of generating multi-value data based on readout data. Next, the multi-value data is input to a demodulation unit 131 and converted into binary data by demodulation processing. Next, a playback data deformatting unit 132 generates playback data on the basis of a demodulated binary signal.

This is the general flow of the playback processing. Hereinafter, processing of each component will be described.

Note that the light intensities of laser during recording and during playback are different, and satisfy:

The laser light intensity during recording (Pw)>The laser light intensity during playback (Pr).

However, the beam spot size and the relative shape of the beam profile are the same.

The mark string recorded on the disk 10 is convoluted with the two-dimensional intensity distribution (power profile) of the beam spot on a disk surface in the track direction and becomes reflected light, is read out by a photodetector (PD) 114 via an objective lens 116 and the beam splitter 115 of the optical pickup unit (OPU) 108, and is input to a front-end process (FEP) 121 as a playback radio frequency signal (PBRF).

The FEP 121 performs playback signal shaping processing such as readout signal amplification processing, wide-area noise component removal processing, and necessary signal band enhancement processing, and outputs a processed signal to an analog to digital converter (ADC)-phase locked loop (PLL) 122.

The ADC of the ADC-PLL 122 performs digital conversion of the playback signal input from the FEP 121. The PLL executes playback clock generation processing.

Digital conversion data of the playback signal and the playback clock signal generated by the ADC-PLL 122 are output to the partial response maximum likelihood (PRML) 123.

The PRML 123 refers to a reference level specified in advance by a predetermined intersymbol interference by a partial response maximum likelihood decoding processing (partial response maximum likelihood detection method: PRML detection method), and estimates a likelihood of the sequence of the playback signal by the Viterbi algorithm and generates a multi-value data string. The multi-value data string is a data string including multi-value data having three or more values, such as tri-value data.

The playback multi-value signal string generated by the PRML 123 is output to the demodulation unit (demodulator) 131.

The demodulation unit (demodulator) 131 receives an input of the multi-value data string from the PRML 123, and performs demodulation processing, that is, reverse processing of the multi-value modulation executed by the multi-value modulation unit (modulator) 105 to restore the binary data from the multi-value data such as tri-value data.

Specifically, the demodulation unit (demodulator) 131 executes processing of restoring the FIG. 2A binary data from the FIG. 2B multi-value conversion data described with reference to FIGS. 2A, 2B, 2C, and 2D.

The binary data restored by the demodulation unit (demodulator) 131 on the basis of the playback signal from the disk 10 is input to the playback data deformatting unit (ECC DEC deformatter) 132.

The playback data deformatting unit (ECC DEC deformatter) 132 generates a binary data string to be used as the playback signal from the binary data (disk-recorded format data) input from the demodulation unit (demodulator) 131. Specifically, the playback data deformatting unit (ECC deformatter) 132 performs error correction and the like using ECC, for example, and generates the binary data string constituting the playback signal of images, sounds, and the like.

The binary data that is the playback signal generated by the playback data deformatting unit (ECC DEC deformatter) 132 is transferred to the external device 150 via the control unit 102 and the host IF 101, and is used as data of images, sounds, and another data based on the playback signal in the external device 150.

Next, a specific example of the recording pulse generation unit 106 will be described with reference to FIGS. 4A, 4B, 4C, 4D, 4E, and 4F.

The recording pulse generation unit 106 executes processing of generating the FIG. 2C recording pulse from the FIG. 2B multi-value modulation data described with reference to FIGS. 2A, 2B, 2C, and 2D.

Note that the pulse generated by the recording pulse generation unit 106 does not include the pulse for recording the mark having the size exceeding the beam spot, as described with reference to FIGS. 1A, 1B, 1C, and 1D. The pulse generated by the recording pulse generation unit 106 includes only the mark having a predetermined size, as described with reference to FIGS. 2A, 2B, 2C, and 2D.

FIGS. 4A, 4B, 4C, 4D, 4E, and 4F illustrate a configuration example using a delta sigma ($\Delta\Sigma$) modulator 210 as a configuration example of the recording pulse generation unit 106. The delta sigma modulator 210 includes a difference calculation unit 211, an accumulator 212, and a requantization unit 213, as illustrated in FIGS. 4A, 4B, 4C, 4D, 4E, and 4F.

The difference calculation unit 211 outputs a difference between the multi-value modulation data input from the multi-value modulation unit 105 and feedback data from the requantization unit 213 to the accumulator 212. The accumulator 212 generates delta sigma ($\Delta\Sigma$) modulation data by arithmetic processing based on the difference data and outputs the delta sigma (ΔΣ) modulation data to the requantization unit 213. The requantization unit 213 executes quantization processing for the delta sigma (ΔΣ) modulation data and outputs quantization data to an edge trigger 220.

The edge trigger 220 performs waveform shaping to extract an edge portion of an output from the requantization unit 213 of the delta sigma modulator 210 to generate recording pulse output data, and outputs the recording pulse output data to the recording correction unit 107.

Examples of the data generated by the components of the recording pulse generation unit 106 illustrated in FIGS. 4A, 4B, 4C, 4D, 4E, and 4F, that is:

FIG. 4A the multi-value modulation data output from the multi-value modulation unit 105;

FIG. 4B the delta sigma (ΔΣ) modulation data generated by the accumulator 212;

FIG. 4C requantization data generated by the requantization unit 213; and FIG. 4D the recording pulse output data generated by the recording pulse generation unit 106 are illustrated in FIGS. 5A, 5B, 5C, 5D, and 5E.

FIGS. 5A, 5B, 5C, 5D, and 5E illustrate the data FIGS. 5A, 5B, 5C, and 5D from the top. Moreover, an example of FIG. 5E recording mark string recorded on the disk 10 is also illustrated on the basis of the FIG. 5D recording pulse output data.

The horizontal axis of the graphs illustrated in FIGS. 5A, 5B, 5C, and 5D corresponds to a time axis.

The FIG. 5A multi-value modulation data in FIGS. 5A, 5B, 5C, 5D, and 5E is not tri-value data described with reference to FIGS. 2A, 2B, 2C, and 2D but is an example of seven-value (S0 to S6) multi-value data.

A transition rule among the seven values of S0 to S6 in FIG. 5A illustrating waveforms of the units of the embodiment in FIGS. 4A, 4B, 4C, 4D, 4E, and 4F are arbitrary. For example, in a case where a bit value of the recording binary data=0, the transition among the seven values of S0 to S6 is not executed, whereas in a case where the bit value of the recording binary data=1, the transition among the seven values of S0 to S6 is executed. The level of multi-value modulation in this case transitions according to a sequence of S0→S1→S2→S3→S4→S5→S6→S5→S4→S3→ S2→ S1→S0.

The seven-value multi-value modulation data is output from the multi-value modulation unit 105 and is input to the recording pulse generation unit 106.

The FIG. 5B delta sigma (ΔΣ) modulation data is delta sigma (ΔΣ) modulation data generated by the accumulator 212 of the recording pulse generation unit 106. Note that this example illustrates first-order delta-sigma modulation data. The pulses are sparser as the multi-value data is closer to S0, and the pulses are denser as the multi-value data is closer to S6.

The FIG. 5C requantization data is requantization data generated by the requantization unit 213, and is generated by processing of quantizing the FIG. 5B delta sigma (ΔΣ) modulation data. Note that this example illustrates an example of binarization.

The FIG. 5D recording pulse output data is recording pulse output data generated by the recording pulse generation unit 106, and is recording pulse output data generated by performing waveform shaping to extract an edge portion of the FIG. 5C requantization data. By the processing, a pulse frequency modulation (PFM) signal is generated and output to the recording correction unit 107.

The recording pulse generation unit 106 generates pulse frequency modulation data (PFM) having a different density according to the value of the multi-value modulation data and outputs the pulse frequency modulation data to the recording correction unit (WS) 107, as illustrated in FIG. 5D.

The recording correction unit 107 records a recording mark on the disk 10 on the basis of the pulse frequency modulation (PFM) signal that is the output of the recording pulse generation unit 106.

That is, the recording correction unit 107 generates and outputs a recording signal to be output to the LDD 111 of the optical pickup unit 108 on the basis of the pulse frequency modulation (PFM) signal. The LDD 111 drives the LD 113 on the basis of the recording signal according to the recording pulse string input from the recording correction unit 107, and records the marks according to the recording pulse string on the disk 10.

The FIG. 5E recording mark string data in FIGS. 5A, 5B, 5C, 5D, and 5E are mark string recorded on the disk 10 on the basis of the FIG. 5D recording pulse output data in FIGS. 5A, 5B, 5C, 5D, and 5E.

Note that, in the processing of the present disclosure, the mark size is only the predetermined size equal to or smaller than the beam spot, as described with reference to FIGS. 2A, 2B, 2C, and 2D. As described above, the mark size control can be executed by the power control of the LD 113 by the LDD 111. By controlling the power of the LD 113, the mark having a predetermined size equal to or smaller than the beam spot can be recorded on the disk 10. Note that the processing of controlling the power of the LD 113 and recording the mark having the predetermined size equal to or smaller than the beam spot is called brush tip recording.

Note that FIGS. 5A, 5B, 5C, 5D, and 5E illustrate the example in which the FIG. 5D recording pulse output data output by the recording pulse string generation unit 106 is the pulse frequency modulation (PFM) signal. However, the data output by the recording pulse string generation unit 106 is not limited to the pulse frequency modulation (PFM) data. For example, a pulse density modulation (PDM) signal or a pulse number modulation (PNM) signal may be adopted. These are pulse modulation methods that express the signal level by the number of pulses per unit time, and are essentially equivalent.

Furthermore, each level of the multi-value recording in the present embodiment is recorded as coarseness or fineness (sparseness or denseness) of the recording marks as illustrated in FIG. 5E and does not include a clear mark unrecorded portion. Therefore, the present embodiment does not include discontinuous phase transition between a mark unrecorded portion and a mark recorded portion as in the current multi-value recording, and is suitable for maintaining the linearity of the levels of the multi-value modulation.

FIGS. 6A and 6B are diagrams illustrating an example of a playback signal in the case of playing back the recording mark string data illustrated in FIG. 5E.

FIGS. 6A and 6B illustrate an example of the FIG. 6B playback RF signal (PBRF) read out by the photodetector (PD) 114 of the optical pickup unit (OPU) 108 illustrated in FIGS. 4A, 4B, 4C, 4D, 4E, and 4F.

The FIG. 6B playback RF signal (PBRF) obtained such that the FIG. 6A mark string recorded on the disk 10 is convoluted with the two-dimensional intensity distribution (power profile) of the beam spot on a disk surface in the track direction and becomes reflected light, and is read out by the photodetector (PD) 114 via the objective lens 116 and the beam splitter 115 of the optical pickup unit (OPU) 108 is input to the FEP 121, and the FEP 121 performs playback signal shaping processing such as readout signal amplification processing, wide-area noise component removal processing, and necessary signal band enhancement processing, and outputs the processed signal to the PRML 123 via the ADC-PLL 122.

The PRML 123 refers to a reference level specified in advance by a predetermined intersymbol interference by a partial response maximum likelihood decoding processing (partial response maximum likelihood detection method: PRML detection method), estimates a likelihood of the sequence of the playback signal by the Viterbi algorithm and generates a multi-value data string, and outputs the multi-value data string to the demodulation unit (demodulator) 131. The demodulation unit 131 receives an input of the multi-value data string from the PRML 123, and restores the binary data from the multi-value data.

[4. Specific Example of Mark Size]

The recording device of the present disclosure adopts the predetermined size equal to or smaller than the beam spot as the size of the mark recorded on the disk. A specific example of the size of the mark will be described below.

FIG. 7A is a diagram for describing an example of specification of the beam spot size when the recording device of the present disclosure reads out the mark string recorded on the disk.

The diameter of the beam spot is D1.

FIG. 7B illustrates an example of specification of the mark size. The mark size is set to the size equal to or smaller than the size of the beam spot when a diameter dm of the mark is equal to or smaller than the diameter D1 of the beam spot.

That is, the mark size dm is set to satisfy the following equation.

$$dm \leq D1$$

By setting the mark size dm to be recorded on the disk to only the predetermined size equal to or smaller than the beam spot size D1, as described above, the interference between the mark of the adjacent track and the beam spot during playback can be reduced, and the crosstalk can be effectively prevented or reduced.

FIGS. 8A and 8B are diagrams for describing another example of specification of the mark size recorded on the disk by the recording device of the present disclosure. FIG. 8A is a diagram for describing the two-dimensional light intensity distribution (power profile) of the beam spot during recording.

As illustrated in FIG. 8A, the two-dimensional light intensity distribution (power profile) of the beam spot is high in a central portion and low in a peripheral portion.

The diameter of the beam spot having a level that is half (Pmax/2) of the maximum value (Pmax) of the two-dimensional light intensity distribution (power profile) of the beam spot is (D2). Here, D2 is referred to as a half width.

The mark size is set to a size equal to or smaller than the half width (D2) of the beam spot.

FIG. 8B illustrates an example of specification of the mark size. The diameter dm of the mark is set to a diameter equal to or smaller than the half width (D2) of the maximum value (Pmax) of the beam spot.

That is, the mark size dm is set to satisfy the following equation.

$$dm \leq D2$$

As described above, by setting the mark size to be recorded to be smaller than the half width of the beam spot, the influence of recording on the adjacent track is reduced during the data recording in the recording device. That is, the crosswrite can be prevented or reduced.

[5. Recording Medium to which Processing of Present Disclosure is Applicable]

Next, a recording medium to which the processing of the present disclosure is applicable will be described. As the medium to which the processing of the present disclosure is applicable, various media such as a medium configured using a pigment material or an inorganic material having reflectance that changes due to light irradiation and a magneto-optical medium using the Kerr effect can be used in addition to the phase change medium.

As the mark to be recorded on these various media, marks having various configurations can be used as long as the configurations cause a change in the reflectance, such as a mark having the reflectance that changes due to a change in shape of a pit, a hole or the like, in addition to the configuration that causes a change only in the reflectance without changing the shape.

Moreover, the configuration of the present disclosure can be used not only in an optical recording-type configuration but also in a device that performs magnetic recording. For example, in magnetic recording, a magnetic domain corresponds to the mark of the present disclosure, and one magnetic domain size corresponds to the mark size of the present disclosure.

In the optical recording configuration described with reference to FIGS. 7A, 7B, 8A, and 8B, the mark size is specified on the basis of the size of the light beam spot. The mark (magnetic domain) size in magnetic recording can be specified on the basis of a recording or playback gap in a magnetic recording/playback device, for example.

For example, the mark size (magnetic domain size) to be recorded is set to a predetermined size equal to or smaller than the width (half width) that is ½ of a maximum value (Pmax) of a magnetic profile of a playback head during playback in the magnetic recording/playback device.

With these configurations, prevention or reduction of crosstalk and crosswrite is implemented even in the magnetic recording/playback device.

[6. Conclusion of Configuration of Present Disclosure]

The embodiments of the present disclosure have been described in detail with reference to the specific embodiments. However, it is obvious that those skilled in the art can make modifications and substitutions of the embodiments without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present description can have the following configurations.

(1) An information recording device including:

a recording pulse generation unit configured to generate a recording pulse based on multi-value modulation data; and a data recording unit configured to record a mark on a recording medium on the basis of the recording pulse generated by the recording pulse generation unit, in which the data recording unit executes data recording processing of setting sizes of all of marks to be recorded on the recording medium to be a size equal to or smaller than a spot size of a beam spot.

(2) The information recording device according to (1), in which the data recording unit executes the data recording processing of setting sizes of all of marks to be recorded on the recording medium to be a size equal to or smaller than the spot size at a half (½) level of a maximum value (Pmax) of a two-dimensional light intensity distribution (power profile) of the beam spot.

(3) The information recording device according to (1) or (2), in which the data recording unit executes the data recording processing of forming recording regions in a plurality of modes having different densities of recording marks on the recording medium according to a value of the multi-value modulation data.

(4) The information recording device according to any one of (1) to (3), in which the data recording unit executes the data recording processing of forming recording regions in at least three or more types of different modes below:

(a) a mark non-recording region,
(b) a mark recording region with a first density, and
(c) a mark recording region with a second density, where the first density is lower than the second density, on the recording medium according to the value of the multi-value modulation data.

(5) The information recording device according to any one of (1) to (3), in which the data recording unit executes the data recording processing of forming recording regions in at least three or more types of different modes below:

(a) a mark recording region with a first density,
(b) a mark recording region with a second density, and
(c) a mark recording region with a third density, where the first density is lower than the second density, and the second density is lower than the third density, on the recording medium according to the value of the multi-value modulation data.

(6) The information recording device according to any one of (1) to (5), in which the recording pulse generation unit generates pulse signals having different densities according to a value of the multi-value modulation data, and outputs the pulse signals to the data recording unit.

(7) The information recording device according to any one of (1) to (6), in which the recording pulse generation unit generates pulse frequency modulation data (PFM) signals,
pulse density modulation (PDM) signals, or
pulse number modulation (PNM) signals having different densities according to a value of the multi-value modulation data, and the data recording unit executes the data recording processing of forming a mark on the recording medium on the basis of the recording pulse.

(8) The information recording device according to any one of (1) to (7), in which the recording pulse generation unit includes a delta sigma modulator configured by a difference calculation unit, an accumulation adder (accumulator), and a requantization unit, and generates recording pulses in a plurality of modes having different pulse densities according to a value of the multi-value modulation data, and the data recording unit executes the data recording processing of forming a mark on the recording medium on the basis of the recording pulse.

(9) The information recording device according to any one of (1) to (8), in which the data recording unit includes a recording correction unit and an optical pickup unit (OPU), the recording correction unit corrects a width and timing of the recording pulse generated by the recording pulse generation unit to generate a recording signal to be output to a laser diode driver (LDD) constituting the OPU, and the LDD drives a laser diode (LD) constituting the OPU using the recording signal generated by the recording correction unit, and the LDD controls output light intensity of the LD on the basis of a light intensity detection signal of an output of the LD output by a front monitor photodetector (FPD) constituting the OPU, and performs mark recording by brush tip recording.

(10) An information recording medium in which marks based on multi-value modulation data are recorded, in which only the marks having a size equal to or smaller than a spot size of a beam spot are recorded.

(11) The information recording medium according to (10), in which all the marks have a size equal to or smaller than the spot size at a half (½) level of a maximum value (Pmax) of a two-dimensional light intensity distribution (power profile) of the beam spot.

(12) An information playback device including:

a data readout unit configured to execute readout of a mark recorded in an information recording medium and acquire multi-value modulation data; and a demodulation unit configured to receive an input of the multi-value modulation data acquired by the data readout unit and generate binary data, in which the data readout unit executes processing of reading only a mark having a size equal to or smaller than a spot size of a beam spot of an optical pickup unit.

(13) The information playback device according to (12), in which the data readout unit executes processing of reading only a mark having a size equal to or smaller than the spot size at a half (½) level of a maximum value (Pmax) of a two-dimensional light intensity distribution (power profile) of the beam spot of the optical pickup unit.

(14) An information recording method in which an information recording device executes information recording processing on an information recording medium, the information recording method including:

by a recording pulse generation unit, a recording pulse generation step of generating a recording pulse based on multi-value modulation data; and by a data recording unit, a data recording step of recording a mark on a recording medium on the basis of the recording pulse generated by the recording pulse generation unit, in which, in the data recording step, data recording processing of setting sizes of all of marks to be recorded on the recording medium to be a size equal to or smaller than a spot size of a beam spot is executed.

(15) A program for causing an information recording device to execute information recording processing on an information recording medium, the information recording processing including:

a recording pulse generation step of causing a recording pulse generation unit to generate a recording pulse based on multi-value modulation data; and a data recording step of causing a data recording unit to record a mark on a recording medium on the basis of the recording pulse generated by the recording pulse generation unit, in which, in the data recording step, data recording processing of setting sizes of all of marks to be recorded on the recording medium to be a size equal to or smaller than a spot size of a beam spot is executed.

Furthermore, the series of processing described in the description can be executed by hardware, software, or a combined configuration of the hardware and software. In the case of executing the processing by software, a program, in which the processing sequence is recorded, can be installed in a memory of a computer incorporated in dedicated hardware and executed by the computer, or the program can be installed in and executed by a general-purpose computer capable of executing various types of processing. For example, the program can be recorded on the recording medium in advance. Other than the installation from the recording medium to the computer, the program can be received via a network such as a local area network (LAN) or the Internet and installed on a recording medium such as a built-in hard disk.

Note that the various types of processing described in the description may be executed not only in chronological order as described but also in parallel or individually depending on the processing capability of the device that executes the process or as required. Furthermore, the system in the present description is a logical aggregate configuration of a plurality of devices, and is not limited to devices having respective configurations within the same housing.

INDUSTRIAL APPLICABILITY

As described above, according to the configuration of the embodiment of the present disclosure, the configuration to make the size of the mark to be recorded on the recording medium small to enable prevention and reduction of crosstalk and crosswrite is implemented.

Specifically, for example, the recording pulse generation unit configured to generate the recording pulse based on the multi-value modulation data, and the data recording unit configured to record the mark on the recording medium on the basis of the recording pulse are included. The data recording unit executes the recording processing of setting sizes of all of marks to be recorded on the recording medium to a size equal to or smaller than the spot size at the half (½) level of the maximum value (Pmax) of the two-dimensional light intensity distribution (power profile) of the beam spot, and executes the data recording processing of forming the recording regions in at least three types of different modes: (a) mark non-recording region, (b) low-density mark recording region, and (c) high-density mark recording region according to the value of the multi-value modulation data.

With the present configuration, a configuration to make the size of the mark to be recorded on the recording medium small to enable prevention and reduction of crosstalk and crosswrite is implemented.

REFERENCE SIGNS LIST

10 Disk
100 Recording/playback device
101 Host IF
102 Control unit
103 Storage unit
104 Recording data formatting unit
105 Multi-value modulation unit
106 Recording pulse generation unit
107 Recording correction unit
108 Optical pickup unit (OPU)
111 LDD
112 FPD
113 LD
114 PD
115 Beam splitter
116 Objective lens
121 FEP
122 ADDPLL
123 PRML
131 Demodulation unit
132 Playback data formatting unit
150 External device
210 Delta sigma modulator
211 Difference calculation unit
212 Accumulator
213 Requantization unit
220 Edge trigger

The invention claimed is:

1. An information recording device, comprising:
a recording pulse generation unit configured to generate a recording pulse based on multi-value modulation data; and
a data recording unit configured to:
record a mark on a recording medium based on the recording pulse generated by the recording pulse generation unit; and
execute a data recording processing to set sizes of all of marks to be recorded on the recording medium to be a size equal to or smaller than a spot size of a beam spot at a half level of a maximum value of a two-dimensional light intensity distribution of the beam spot.

2. The information recording device according to claim 1, wherein
the data recording unit is further configured to execute the data recording processing to form a plurality of recording regions in a plurality of modes, and
the plurality of recording regions in the plurality of modes has different densities of recording marks on the recording medium based on a value of the multi-value modulation data.

3. The information recording device according to claim 1, wherein
the data recording unit is further configured to execute the data recording processing to form a plurality of recording regions in at least three or more types of different modes on the recording medium based on a value of the multi-value modulation data, and
the at least three or more types of different modes include:
a mark non-recording region,
a first mark recording region with a first density, and
a second mark recording region with a second density, wherein
the first density is lower than the second density.

4. The information recording device according to claim 1, wherein the data recording unit is further configured to execute the data recording processing to form a plurality of recording regions in at least three or more types of different modes on the recording medium based on a value of the multi-value modulation data, and
the at least three or more types of different modes include:
a first mark recording region with a first density,
a second mark recording region with a second density, and
a third mark recording region with a third density, wherein
the first density is lower than the second density, and
the second density is lower than the third density.

5. The information recording device according to claim 1, wherein the recording pulse generation unit is further configured to:

generate a plurality of pulse signals having different densities based on a value of the multi-value modulation data; and
output the plurality of pulse signals to the data recording unit.

6. The information recording device according to claim 1, wherein
the recording pulse generation unit is further configured to generate the recording pulse based on one of pulse frequency modulation (PFM) signals, pulse density modulation (PDM) signals, or pulse number modulation (PNM) signals having different densities, wherein the different densities are based on a value of the multi-value modulation data, and
the data recording unit is further configured to execute the data recording processing to form the mark on the recording medium based on the recording pulse.

7. The information recording device according to claim 1, wherein
the recording pulse generation unit includes a delta sigma modulator,
the delta sigma modulator includes:
a difference calculation unit;
an accumulation adder; and
a requantization unit,
the recording pulse generation unit is further configured to generate a plurality of recording pulses in a plurality of modes having different pulse densities based on a value of the multi-value modulation data, and
the data recording unit is further configured to execute the data recording processing to form the mark on the recording medium based on the plurality of recording pulses.

8. The information recording device according to claim 1, wherein the data recording unit includes:
a recording correction unit configured to:
correct a width and a timing of the recording pulse generated by the recording pulse generation unit; and
generate a recording signal based on the corrected width and the timing of the recording pulse; and
an optical pickup unit (OPU) comprising:
a laser diode (LD);
a front monitor photodetector (FPD) configured to output a light intensity detection signal of an output of the LD; and
a laser diode driver (LDD) configured to:
drive the LD based on the recording signal generated by the recording correction unit;
control an output light intensity of the LD based on the light intensity detection signal; and
perform the mark recording based on a brush tip recording.

9. An information recording medium, comprising:
a plurality of marks recorded based on multi-value modulation data,
wherein all the recorded marks have a size equal to or smaller than a spot size of a beam spot at a half level of a maximum value of a two-dimensional light intensity distribution of the beam spot.

10. An information playback device, comprising:
a data readout unit configured to:
execute readout of a mark recorded in an information recording medium, wherein the mark has a size equal to or smaller than a spot size of a beam spot of an optical pickup unit at a half level of a maximum value of a two-dimensional light intensity distribution of the beam spot; and
acquire multi-value modulation data; and
a demodulation unit configured to:
receive an input of the multi-value modulation data acquired by the data readout unit; and
generate binary data.

11. An information recording method, comprising:
generating, by a recording pulse generation unit of an information recording device, a recording pulse based on multi-value modulation data;
setting, by a data recording unit of the information recording device, sizes of all of marks to be recorded on a recording medium to be a size equal to or smaller than a spot size of a beam spot at a half level of a maximum value of a two-dimensional light intensity distribution of the beam spot; and
recording, by the data recording unit, a mark on the recording medium based on the generated recording pulse.

12. A non-transitory computer-readable medium having stored thereon computer-executable instructions, that when executed by a processor of an information recording device, cause the processor to execute operations, the operations comprising:
generating a recording pulse based on multi-value modulation data;
setting sizes of all of marks to be recorded on a recording medium to be a size equal to or smaller than a spot size of a beam spot at a half level of a maximum value of a two-dimensional light intensity distribution of the beam spot; and
recording a mark on the recording medium based on the generated recording pulse.

13. An information recording device, comprising:
a recording pulse generation unit configured to generate a recording pulse based on multi-value modulation data; and
a data recording unit configured to:
record a mark on a recording medium based on the recording pulse generated by the recording pulse generation unit;
set sizes of all of marks to be recorded on the recording medium to be a size equal to or smaller than a spot size of a beam spot; and
form a plurality of recording regions in a plurality of modes having different densities of recording marks on the recording medium based on a value of the multi-value modulation data.

* * * * *